United States Patent [19]
Manning et al.

[11] Patent Number: 5,956,342
[45] Date of Patent: Sep. 21, 1999

[54] PRIORITY ARBITRATION FOR POINT-TO-POINT AND MULTIPOINT TRANSMISSION

[75] Inventors: Thomas A. Manning, Northboro; Stephen A. Caldara, Sudbury; Stephen A. Hauser, Burlington; Matthias L. Colsman, Cologne, all of Mass.

[73] Assignees: Fujitsu Network Communications, Inc., Richardson, Tex.; Fujitsu Limited, Kawasaki, Japan

[21] Appl. No.: 08/683,153

[22] Filed: Jul. 18, 1996

Related U.S. Application Data

[60] Provisional application No. 60/001,498, Jul. 19, 1995.

[51] Int. Cl.[6] .................................................. H04L 12/56
[52] U.S. Cl. .......................... 370/414; 370/429; 370/432; 370/905; 340/825.5
[58] Field of Search ................................... 370/252, 253, 370/357, 360, 381–383, 389, 390, 392, 395, 398, 399, 412–418, 428, 429, 431, 432, 437, 458, 462, 465, 468, 902, 905; 340/825.5; 348/7

[56] References Cited

U.S. PATENT DOCUMENTS

| | | | |
|---|---|---|---|
| 3,804,991 | 4/1974 | Hammond et al. | 379/222 |
| 3,974,343 | 8/1976 | Cheney et al. | 379/244 |
| 4,069,399 | 1/1978 | Barrett et al. | 370/363 |
| 4,603,382 | 7/1986 | Cole et al. | 364/264 |
| 4,715,030 | 12/1987 | Koch et al. | 370/401 |
| 4,727,537 | 2/1988 | Nichols | 370/236 |
| 4,737,953 | 4/1988 | Koch et al. | 370/401 |
| 4,797,881 | 1/1989 | Ben-Artzi | 370/402 |
| 4,821,034 | 4/1989 | Anderson et al. | 340/825.8 |
| 4,837,761 | 6/1989 | Isono et al. | 370/413 |
| 4,849,968 | 7/1989 | Turner | 370/232 |
| 4,870,641 | 9/1989 | Pattavina | 370/397 |

(List continued on next page.)

FOREIGN PATENT DOCUMENTS 484943  3/1992  Japan .

OTHER PUBLICATIONS

An Ascom Timeplex White Paper, *Meeting Critical Requirements with Scalable Enterprise Networking Solutions Based on a Unified ATM Foundation*, pp. 1–2, Apr. 1994–Apr. 1995?

Douglas H. Hunt, ATM Traffic Management—Another Perspective, *Business Communications Review*, Jul. 1994.

Richard Bubenik et al., Leaf Initiated Join Extensions, Technical Committee, Signalling Subworking Group, *ATM Forum*/94–0325R1, Jul. 1, 1994.

Douglas H. Hunt et al., Flow Controlled Virtual Connections Proposal for ATM Traffic Management (Revision R2), Traffic Management Subworking Group, *ATM Forum*/94–0632R2, Aug. 1994.

(List continued on next page.)

*Primary Examiner*—Douglas W. Olms
*Assistant Examiner*—Seema S. Rao
*Attorney, Agent, or Firm*—Weingarten, Schurgin, Gagnebin & Hayes LLP

[57] ABSTRACT

An Asynchronous Transfer Mode switch and method which facilitate priority arbitration of point-to-point and point-to-multipoint transmission are disclosed. To execute point-to-multipoint operation a bandwidth arbiter maintains a first list of connections and bit vectors indicating designated destination ports. The list maintained by the bandwidth arbiter is then compared to an unassigned output port bit vector to determine matches therebetween at which point-to-multipoint transmission may be made by utilizing instantaneously unused bandwidth within the switch. To execute point-to-point operation each input port maintains a list of connections associated with each output port, and those lists are used in conjunction with output port request information per input port in the bandwidth arbiter to match requests to the unassigned output port bit vector. The bandwidth arbiter may also assign priority to connections in the list.

43 Claims, 10 Drawing Sheets

U.S. PATENT DOCUMENTS

| | | | |
|---|---|---|---|
| 4,872,159 | 10/1989 | Hemmady et al. | 370/352 |
| 4,872,160 | 10/1989 | Hemmady et al. | 370/353 |
| 4,878,216 | 10/1989 | Yunoki | 370/389 |
| 4,893,302 | 1/1990 | Hemmady et al. | 370/427 |
| 4,893,307 | 1/1990 | McKay et al. | 370/387 |
| 4,894,824 | 1/1990 | Hemmady et al. | 370/380 |
| 4,897,841 | 1/1990 | Gang, Jr. | 370/401 |
| 4,899,333 | 2/1990 | Roediger | 370/427 |
| 4,920,531 | 4/1990 | Isono et al. | 370/416 |
| 4,922,503 | 5/1990 | Leone | 370/402 |
| 4,933,938 | 6/1990 | Sheehy | 370/401 |
| 4,947,390 | 8/1990 | Sheehy | 370/401 |
| 4,953,157 | 8/1990 | Franklin et al. | 370/230 |
| 4,956,839 | 9/1990 | Torii et al. | 370/427 |
| 4,958,341 | 9/1990 | Hemmady et al. | 370/352 |
| 4,979,100 | 12/1990 | Makris et al. | 364/260 |
| 4,993,018 | 2/1991 | Hajikano et al. | 370/392 |
| 5,021,949 | 6/1991 | Morten et al. | 364/229 |
| 5,029,164 | 7/1991 | Goldstein et al. | 370/235 |
| 5,060,228 | 10/1991 | Tsutsui et al. | 370/402 |
| 5,067,123 | 11/1991 | Hyodo et al. | 370/396 |
| 5,070,498 | 12/1991 | Kakuma et al. | 370/233 |
| 5,083,269 | 1/1992 | Syobatake et al. | 370/412 |
| 5,084,867 | 1/1992 | Tachibana et al. | 370/399 |
| 5,084,871 | 1/1992 | Carn et al. | 370/462 |
| 5,090,011 | 2/1992 | Fukuta et al. | 370/230 |
| 5,090,024 | 2/1992 | Vander Mey et al. | 375/207 |
| 5,093,912 | 3/1992 | Dong et al. | 395/674 |
| 5,115,429 | 5/1992 | Hluchyj et al. | 370/231 |
| 5,119,369 | 6/1992 | Tanabe et al. | 370/399 |
| 5,119,372 | 6/1992 | Verbeek | 370/230 |
| 5,128,932 | 7/1992 | Li | 370/236 |
| 5,130,975 | 7/1992 | Akata | 370/416 |
| 5,130,982 | 7/1992 | Ash et al. | 370/352 |
| 5,132,966 | 7/1992 | Hayano et al. | 370/233 |
| 5,146,474 | 9/1992 | Nagler et al. | 375/224 |
| 5,146,560 | 9/1992 | Goldberg et al. | 395/376 |
| 5,150,358 | 9/1992 | Punj et al. | 370/418 |
| 5,151,897 | 9/1992 | Suzuki | 370/401 |
| 5,157,657 | 10/1992 | Potter et al. | 370/440 |
| 5,163,045 | 11/1992 | Caram et al. | 370/409 |
| 5,163,046 | 11/1992 | Hahne et al. | 370/409 |
| 5,179,556 | 1/1993 | Turner | 370/233 |
| 5,179,558 | 1/1993 | Thacker et al. | 370/406 |
| 5,185,743 | 2/1993 | Murayama et al. | 370/397 |
| 5,191,582 | 3/1993 | Upp | 370/395 |
| 5,191,652 | 3/1993 | Dias et al. | 395/200.81 |
| 5,193,151 | 3/1993 | Jain | 395/67 |
| 5,197,067 | 3/1993 | Fujimoto et al. | 370/236 |
| 5,198,808 | 3/1993 | Kudo | 340/825.8 |
| 5,199,027 | 3/1993 | Barri | 370/231 |
| 5,239,539 | 8/1993 | Uchida et al. | 370/398 |
| 5,253,247 | 10/1993 | Hirose et al. | 370/250 |
| 5,253,248 | 10/1993 | Dravida et al. | 370/228 |
| 5,255,264 | 10/1993 | Cotton et al. | 370/286 |
| 5,255,266 | 10/1993 | Watanabe et al. | 370/233 |
| 5,257,311 | 10/1993 | Naito et al. | 380/48 |
| 5,258,979 | 11/1993 | Oomuro et al. | 370/232 |
| 5,265,088 | 11/1993 | Takigawa et al. | 370/249 |
| 5,267,232 | 11/1993 | Katsube et al. | 370/232 |
| 5,268,897 | 12/1993 | Komine et al. | 370/400 |
| 5,271,010 | 12/1993 | Miyake et al. | 370/392 |
| 5,272,697 | 12/1993 | Fraser et al. | 370/235 |
| 5,274,641 | 12/1993 | Shobatake et al. | 370/392 |
| 5,274,768 | 12/1933 | Traw et al. | 395/850 |
| 5,280,469 | 1/1994 | Taniguchi et al. | 370/250 |
| 5,280,470 | 1/1994 | Buhrke et al. | 370/232 |
| 5,282,201 | 1/1994 | Frank et al. | 370/403 |
| 5,283,788 | 2/1994 | Morita et al. | 370/236 |
| 5,285,446 | 2/1994 | Yonehara | 370/230 |
| 5,287,349 | 2/1994 | Hyodo et al. | 370/399 |
| 5,287,535 | 2/1994 | Sakagawa et al. | 370/389 |
| 5,289,462 | 2/1994 | Ahmadi et al. | 370/232 |
| 5,289,463 | 2/1994 | Mobasser | 370/230 |
| 5,289,470 | 2/1994 | Chang et al. | 379/88.28 |
| 5,291,481 | 3/1994 | Doshi et al. | 370/230 |
| 5,291,482 | 3/1994 | McHarg et al. | 370/413 |
| 5,295,134 | 3/1994 | Yoshimura et al. | 370/220 |
| 5,301,055 | 4/1994 | Bagchi et al. | 359/139 |
| 5,301,184 | 4/1994 | Uriu et al. | 370/219 |
| 5,301,190 | 4/1994 | Tsukuda et al. | 370/398 |
| 5,301,193 | 4/1994 | Toyofuku et al. | 370/395 |
| 5,303,232 | 4/1994 | Faulk, Jr. | 390/398 |
| 5,305,311 | 4/1994 | Lyles | 370/390 |
| 5,309,431 | 5/1994 | Tominaga et al. | 370/230 |
| 5,309,438 | 5/1994 | Nakajima | 370/395 |
| 5,311,586 | 5/1994 | Bogart et al. | 379/221 |
| 5,313,454 | 5/1994 | Bustini et al. | 370/231 |
| 5,313,458 | 5/1994 | Suzuki | 370/389 |
| 5,315,586 | 5/1994 | Charvillat | 370/232 |
| 5,319,638 | 6/1994 | Lin | 370/400 |
| 5,321,695 | 6/1994 | Proctor et al. | 370/401 |
| 5,323,389 | 6/1994 | Bitz et al. | 370/397 |
| 5,333,131 | 7/1994 | Tanabe et al. | 370/410 |
| 5,333,134 | 7/1994 | Ishibashi et al. | 370/230 |
| 5,335,222 | 8/1994 | Kamoi et al. | 370/230 |
| 5,335,325 | 8/1994 | Frank et al. | 395/200 |
| 5,339,310 | 8/1994 | Taniguchi | 370/397 |
| 5,339,317 | 8/1994 | Tanaka et al. | 370/460 |
| 5,339,318 | 8/1994 | Tanaka et al. | 370/399 |
| 5,341,366 | 8/1994 | Soumiya et al. | 370/233 |
| 5,341,373 | 8/1994 | Ishibashi et al. | 370/440 |
| 5,341,376 | 8/1994 | Yamashita | 370/474 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/367 |
| 5,357,506 | 10/1994 | Sugawara | 370/392 |
| 5,357,507 | 10/1994 | Hughes et al. | 370/234 |
| 5,357,508 | 10/1994 | Le Boudec et al. | 370/397 |
| 5,357,510 | 10/1994 | Norizuki et al. | 370/395 |
| 5,359,600 | 10/1994 | Ueda et al. | 370/399 |
| 5,361,251 | 11/1994 | Aihara et al. | 370/252 |
| 5,361,372 | 11/1994 | Rege et al. | 395/200.64 |
| 5,363,433 | 11/1994 | Isono | 379/390 |
| 5,365,514 | 11/1994 | Hershey et al. | 390/241 |
| 5,371,893 | 12/1994 | Price et al. | 395/729 |
| 5,373,504 | 12/1994 | Tanaka et al. | 370/253 |
| 5,375,117 | 12/1994 | Morita et al. | 370/420 |
| 5,377,262 | 12/1994 | Bales et al. | 379/220 |
| 5,377,327 | 12/1994 | Jain et al. | 395/65 |
| 5,379,297 | 1/1995 | Glover et al. | 370/234 |
| 5,379,418 | 1/1995 | Shimazaki et al. | 395/182.06 |
| 5,390,170 | 2/1995 | Sawant et al. | 370/399 |
| 5,390,174 | 2/1995 | Jugel | 370/392 |
| 5,390,175 | 2/1995 | Hiller et al. | 370/398 |
| 5,392,280 | 2/1995 | Zheng | 370/231 |
| 5,392,402 | 2/1995 | Robrock, II | 395/200.57 |
| 5,394,396 | 2/1995 | Yoshimura et al. | 370/236 |
| 5,394,397 | 2/1995 | Yanagi et al. | 370/60.1 |
| 5,398,235 | 3/1995 | Tsuzuki et al. | 370/219 |
| 5,400,337 | 3/1995 | Munter | 370/399 |
| 5,402,415 | 3/1995 | Turner | 370/390 |
| 5,412,648 | 5/1995 | Fan | 370/414 |
| 5,414,703 | 5/1995 | Sakaue et al. | 370/412 |
| 5,420,858 | 5/1995 | Marshall et al. | 370/352 |
| 5,420,988 | 5/1995 | Elliott | 395/898 |
| 5,422,879 | 6/1995 | Parsons et al. | 370/236 |
| 5,425,021 | 6/1995 | Derby et al. | 370/408 |
| 5,425,026 | 6/1995 | Mori | 370/410 |
| 5,432,713 | 7/1995 | Takeo et al. | 364/514 |
| 5,432,784 | 7/1995 | Ozveren | 370/235 |
| 5,432,785 | 7/1995 | Ahmed et al. | 370/410 |

| | | | |
|---|---|---|---|
| 5,432,908 | 7/1995 | Heddes et al. | 370/412 |
| 5,436,886 | 7/1995 | McGill | 370/219 |
| 5,436,893 | 7/1995 | Barnett | 370/392 |
| 5,440,547 | 8/1995 | Easki et al. | 370/395 |
| 5,444,702 | 8/1995 | Burnett et al. | 370/254 |
| 5,446,733 | 8/1995 | Tsuruoka | 370/232 |
| 5,446,737 | 8/1995 | Cidon et al. | 370/452 |
| 5,446,738 | 8/1995 | Kim et al. | 370/395 |
| 5,448,559 | 9/1995 | Hayter et al. | 370/398 |
| 5,450,406 | 9/1995 | Esaki et al. | 370/396 |
| 5,452,296 | 9/1995 | Shimizu | 370/399 |
| 5,455,820 | 10/1995 | Yamada | 370/413 |
| 5,455,825 | 10/1995 | Lauer et al. | 370/413 |
| 5,457,687 | 10/1995 | Newman | 370/232 |
| 5,459,743 | 10/1995 | Fukuda et al. | 371/399 |
| 5,461,611 | 10/1995 | Drake, Jr. et al. | 370/420 |
| 5,463,620 | 10/1995 | Sriram | 370/60 |
| 5,465,331 | 11/1995 | Yang et al. | 395/200.74 |
| 5,475,679 | 12/1995 | Munter | 370/395 |
| 5,479,401 | 12/1995 | Bitz et al. | 370/397 |
| 5,479,402 | 12/1995 | Hata et al. | 370/397 |
| 5,485,453 | 1/1996 | Ben-Nun et al. | 370/395 |
| 5,485,455 | 1/1996 | Dobbins et al. | 370/255 |
| 5,487,063 | 1/1996 | Kakuma et al. | 370/396 |
| 5,488,606 | 1/1996 | Kakuma et al. | 370/219 |
| 5,491,691 | 2/1996 | Shtayer et al. | 370/395 |
| 5,491,694 | 2/1996 | Oliver et al. | 370/455 |
| 5,493,566 | 2/1996 | Ljungberg et al. | 370/231 |
| 5,497,369 | 3/1996 | Wainwright | 370/390 |
| 5,499,238 | 3/1996 | Shon | 370/411 |
| 5,504,741 | 4/1996 | Yamanaka et al. | 370/412 |
| 5,504,742 | 4/1996 | Kakuma et al. | 370/420 |
| 5,506,834 | 4/1996 | Sekihata et al. | 370/253 |
| 5,506,839 | 4/1996 | Hatta | 370/236 |
| 5,506,956 | 4/1996 | Cohen | 395/182.04 |
| 5,509,001 | 4/1996 | Tachibana et al. | 370/230 |
| 5,509,007 | 4/1996 | Takashima et al. | 370/391 |
| 5,513,134 | 4/1996 | Cooperman et al. | 365/49 |
| 5,513,178 | 4/1996 | Tanaka | 370/395 |
| 5,513,180 | 4/1996 | Miyake et al. | 370/352 |
| 5,515,359 | 5/1996 | Zheng | 370/231 |
| 5,517,495 | 5/1996 | Lund et al. | 370/60 |
| 5,519,690 | 5/1996 | Suzuka et al. | 370/395 |
| 5,521,905 | 5/1996 | Oda et al. | 370/232 |
| 5,521,915 | 5/1996 | Dieudonne et al. | 370/395 |
| 5,521,916 | 5/1996 | Choudhury et al. | 370/414 |
| 5,521,917 | 5/1996 | Watanabe et al. | 370/399 |
| 5,521,923 | 5/1996 | Willman et al. | 370/412 |
| 5,523,999 | 6/1996 | Takano et al. | 370/389 |
| 5,524,113 | 6/1996 | Gaddis | 370/395 |
| 5,526,344 | 6/1996 | Diaz et al. | 370/463 |
| 5,528,588 | 6/1996 | Bennett et al. | 370/396 |
| 5,528,590 | 6/1996 | Iidaka et al. | 370/395 |
| 5,528,591 | 6/1996 | Lauer | 370/231 |
| 5,530,695 | 6/1996 | Dighe et al. | 370/232 |
| 5,533,009 | 7/1996 | Chen | 370/232 |
| 5,533,020 | 7/1996 | Byrn et al. | 370/395 |
| 5,535,196 | 7/1996 | Aihara et al. | 370/429 |
| 5,535,197 | 7/1996 | Cotton | 370/429 |
| 5,537,394 | 7/1996 | Abe et al. | 370/252 |
| 5,541,912 | 7/1996 | Choudhury et al. | 370/412 |
| 5,544,168 | 8/1996 | Jeffrey et al. | 370/391 |
| 5,544,169 | 8/1996 | Norizuki et al. | 370/395 |
| 5,544,170 | 8/1996 | Kasahara | 370/253 |
| 5,546,389 | 8/1996 | Wippenbeck et al. | 370/412 |
| 5,546,391 | 8/1996 | Hochschild et al. | 370/413 |
| 5,546,392 | 8/1996 | Boal et al. | 370/438 |
| 5,550,821 | 8/1996 | Akiyoshi | 370/352 |
| 5,550,823 | 8/1996 | Irie et al. | 370/60.1 |
| 5,553,057 | 9/1996 | Nakayama | 370/241 |
| 5,553,068 | 9/1996 | Aso et al. | 370/390 |
| 5,555,243 | 9/1996 | Kakuma et al. | 370/352 |
| 5,555,265 | 9/1996 | Kakuma et al. | 370/352 |
| 5,557,607 | 9/1996 | Holden | 370/413 |
| 5,568,479 | 10/1996 | Watanabe et al. | 370/399 |
| 5,570,361 | 10/1996 | Norizuki et al. | 370/395 |
| 5,570,362 | 10/1996 | Nishimura | 370/395 |
| 5,572,522 | 11/1996 | Calamvokis et al. | 370/395 |
| 5,577,032 | 11/1996 | Sone et al. | 370/390 |
| 5,577,035 | 11/1996 | Hayter et al. | 370/395 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 .... 12/1993 |

OTHER PUBLICATIONS

Flavio Bonomi et al., The Rate–Based Flow Control Framework for the Available Bit Rate ATM Service, *IEEE Network*, Mar./Apr. 1995, pp. 25–39.

R. Jain, Myths About Congestion Management in High Speed Networks, *Internetworking Research and Experience*, vol. 3, 101–113 (1992).

Douglas H. Hunt et al., Credit–Based FCVC Proposal for ATM Traffic Management (Revision R1), ATM Forum Technical Committee Traffic Management Subworking Group, *ATM_Forum*/94–0168R1, Apr. 1994.

Douglas H. Hunt et al., Action Item Status for Gredit–Based FCVC Proposal, ATM Forum Technical Committee Traffic Management Subworking Group, *ATM_Forum*/94–0439, Apr. 28, 1994.

Timothy P. Donahue et al., Arguments in Favor of Continuing Phase 1 as the Initial ATM Forum P–NNI Routing Protocol Implementation, ATM Forum Technical Committee, *ATM Forum*/94–0460, Apr. 28, 1994.

Richard Bubenick et al., Leaf Initiated Join Extensions, Technical Committee, Signalling Subworking Group, *ATM Forum*/94–0325, Apr. 28, 1994.

Rob Coltun et al., PRP: A P–NNI Routing Protocol Proposal, ATM Forum Committee, *ATM Forum*/94–0492, Apr. 28, 1994.

Richard Bubenik et al., Leaf Initiated Joinm Extensions, ATM Forum Technical Committee, Signalling Subworking Group, *ATM Forum* 94–0325, Apr. 28, 1994.

Richard Bubenik et al., Requirements For Phase 2 Signalling Protocol, ATM Forum Technical Committee, Signalling Subworking Group, *ATM Forum* 94–1078, Jan. 1, 1994.

SITA, ATM RFP: C–Overall Technical Requirements, Sep. 1994.

H.T. Kung and K. Chang, Receiver–Oriented Adaptive Buffer Allocation in Credit–Based Flow Control for ATM Networks, *Proceedings of INFOCOM '95*, Apr. 2–6, 1995, pp. 1–14.

H.T. Kung, et al., Credit–Based Flow Control for ATM Networks: Credit Update Protocol, Adaptive Credit Allocation, and Statistical Multiplexing, *Proceedings of ACM SIGCOMM '94 Symposium on Communications Architectures, Protocols and Applications*, Aug. 31–Sep. 2, 1994, pp. 1–14.

Head of Line Arbitration in ATM Switches with Input–Output Buffering and Backpressure Control. By Hosien F. Badran and H. T. Mouftah, *Globecom '91*, pp. 0347–0351.

TSPP i+1

| y | h | p | q |
|---|---|---|---|
| 0 | 0 | 0 | 1 |
| 0 | 0 | 0 | 0 |
| 1 | 1 | 0 | 0 |
| 0 | 0 | 0 | 0 |
| 1 | 0 | 1 | 1 |
| 0 | 0 | 1 | 0 |
| 0 | 1 | 0 | 0 |
| 0 | 1 | 0 | 0 |

TSPP i

| m | r | k | a |
|---|---|---|---|
| 0 | 1 | 1 | 0 |
| 0 | 0 | 1 | 0 |
| 0 | 0 | 0 | 0 |
| 0 | 1 | 1 | 0 |
| 0 | 0 | 1 | 0 |
| 1 | 0 | 0 | 1 |
| 0 | 0 | 0 | 1 |
| 1 | 0 | 0 | 0 |

NEWEST      OLDEST

LISTS MAINTAINED BY BANDWIDTH ARBITER 53

PRIORITY ARBITRATION FOR POINT-TO-POINT AND MULTIPOINT TRANSMISSION

RELATED CASE INFORMATION

A claim of priority is made to provisional application 60/001,498 entitled COMMUNICATION METHOD AND APPARATUS, filed Jul. 19, 1995.

FIELD OF THE INVENTION

The present invention is generally related to telecommunications networks, and more particularly to point-to-point and point-to-multipoint arbitration, bandwidth allocation and delay management within an asynchronous transfer mode switch.

BACKGROUND OF THE INVENTION

Telecommunications networks such as asynchronous transfer mode ("ATM") networks are used for transfer of audio, video and other data. ATM networks deliver data by routing data units such as ATM cells from source to destination through switches. Switches include input/output ("I/O") ports through which ATM cells are received and transmitted. The appropriate output port for transmission of the cell is determined based on the cell header.

One problem associated with ATM networks is loss of cells. Cells are buffered within each switch before being routed and transmitted from the switch. More particularly, switches typically have buffers at either the inputs or outputs of the switch for temporarily storing cells prior to transmission. As network traffic increases, there is an increasing possibility that buffer space may be inadequate and data lost. If the buffer size is insufficient, cells are lost. Cell loss causes undesirable interruptions in audio and video data transmissions, and may cause more serious damage to other types of data transmissions.

In point-to-point transmission a cell is transmitted from a single input port to a single output port across the switch fabric. In point-to-multipoint transmission a cell is transmitted from a single input to multiple outputs across the switch fabric. In order to execute such a transmission, each of the designated outputs must be available to receive the cell from the transmitting input, i.e., have adequate buffer space. However, the likelihood that each of the designated outputs will be simultaneously prepared to receive the cell when the cell is enqueued decreases as traffic within the switch increases. In some circumstances this may result in delayed transmission. In the worst case, cells will be delayed indefinitely and incoming cells for that connection are discarded. It would therefore be desirable to facilitate transmission by reducing or eliminating delays and cell loss.

SUMMARY OF THE INVENTION

An Asynchronous Transfer Mode ("ATM") switch and method which facilitate point-to-multipoint and point-to-point transmission is disclosed. The ATM switch includes a bandwidth arbiter, a plurality of input ports including one To Switch Port Processor ("TSPP") per input port and a plurality of output ports. Each input port within the switch includes a switch allocation table ("SAT") which grants bandwidth to connections. Each SAT includes a plurality of sequentially ordered cell time slots and a pointer which is directed to one of the slots. The SAT pointers at each input port are synchronized such that, at any given point in time, each of the pointers is directed to the same slot location in the respective SAT with which the pointer is associated. Each TSPP maintains a list of point-to-point connections, and more particularly maintains one such list for each output port in the switch. The bandwidth arbiter maintains a bit vector for each port indicating requested output ports for transmission of point-to-point cells.

Each connection is assigned bandwidth types based on the traffic type associated with the connection. There are two types of bandwidth to grant within the switch: allocated and dynamic. Allocated bandwidth is bandwidth which is "reserved" for use by the connection to which the bandwidth is allocated. Generally, a connection with allocated bandwidth is guaranteed access to the full amount of bandwidth allocated to that connection. As such, traffic types that need deterministic control of delay are assigned allocated bandwidth. Dynamic bandwidth is bandwidth which is "shared" by any of various competing connections. Because dynamic bandwidth is a shared resource, there is generally no guarantee that any particular connection will have access to a particular amount of bandwidth. For this reason dynamic bandwidth is typically assigned to connections with larger delay bounds. Other connections may be assigned a combination of dynamic and allocated bandwidth. Any cell time where the SAT entry is not valid or where the scheduling list does not contain a cell thus represents an unassigned bandwidth opportunity.

To execute point-to-point operation the switch employs the point-to-point request bit vectors and round robin operations to grant dynamic bandwidth to point-to-point connections. At the start of the cell time, matches are determined in parallel for each bit in each selected request bit vector and granting is then executed according to a prioritization scheme beginning at a first position. Granting opportunities are then provided to the other request bit vectors until granting opportunities have been provided for each request bit vector. A second position indicates an individual bit which receives priority for the granting opportunity. If bandwidth is not granted, granting opportunities are then provided to the other bits in the request bit vector. In the next cell time the first position is then at the next sequential request bit vector relative to the previous cell time if the output port designated by a second position was granted. Otherwise the first position is unchanged. In this manner each TSPP receives equal treatment over time.

To execute point-to-multipoint operation the bandwidth arbiter maintains a list of connections and bit vectors indicating the designated destination ports for a point-to-multipoint cell. The bandwidth arbiter list is then compared to an unassigned output port bit vector generated from the SATs to determine matches therebetween at which point-to-multipoint transmission may be made by utilizing the instantaneously unused bandwidth within the switch. The bandwidth arbiter may also assign priority to connections in the list.

The bandwidth arbiter may also include a combined arbiter mechanism for allocating dynamic bandwidth for both point-to-multipoint and point-to-point connections. In the preferred embodiment each type of connection, i.e., point-to-multipoint and point-to-point, is prioritized into at least two levels of priority such as HI and LO. Dynamic bandwidth is then granted in four main steps. In a first step dynamic bandwidth is granted to HI priority point-to-multipoint connections in the manner described above. In a second step the dynamic bandwidth remaining from the first step is granted to the HI priority point-to-point connections in the manner described above. In a third step the bandwidth remaining from the second step is granted to the LO priority point-to-multipoint connections. In a fourth step the bandwidth remaining from the third step is granted to the LO priority point-to-point connections.

Switch efficiency is increased by utilizing instantaneously unused bandwidth. When switch traffic increases, available bandwidth decreases. Nevertheless, unutilized bandwidth will be present from time to time, and such bandwidth is wasted if not utilized. Therefore, point-to-point and point-to-multipoint transmissions which would otherwise be dropped are made using the otherwise unutilized bandwidth, and switch efficiency is increased. Such use is made possible by the arbitration techniques which reduce delay.

BRIEF DESCRIPTION OF THE DRAWING

These and other features and advantages of the present invention will become apparent from the following detailed description of the drawing in which.

DETAILED DESCRIPTION OF THE DRAWING

Figure 1:
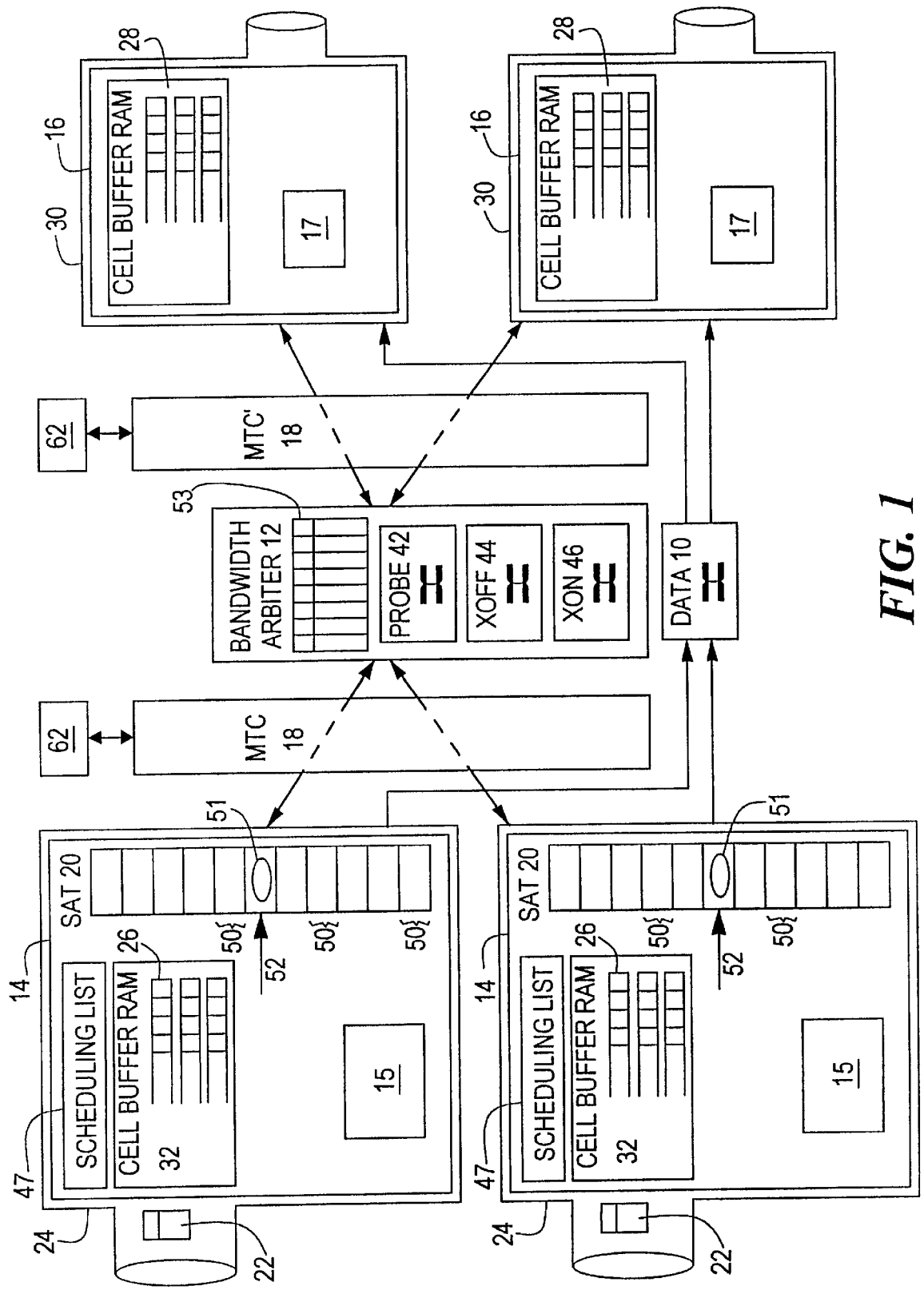
FIG. 1 is a block diagram of a switch which facilitates point-to-multipoint operation.

Referring now to FIG. 1, the switch includes an N×N switch fabric 10, a bandwidth arbiter 12, a plurality of to switch port processor subsystems ("TSPP") 14, a plurality of To Switch Port Processor ASICs 15, a plurality of from switch port processor subsystems ("FSPP") 16, a plurality of To Switch Port Processor ASICs 17, a plurality of multipoint topology controllers ("MTC") 18 and a plurality of switch allocation tables ("SAT") 20. The N×N switch fabric, which may be an ECL crosspoint switch fabric, is used for cell data transport, and yields N×670 Mbps throughput. The bandwidth arbiter controls switch fabric interconnection dynamically schedules momentarily unused bandwidth and resolves multipoint-to-point bandwidth contention. Each TSPP 14 schedules transmission of cells 22 to the switch fabric from multiple connections. Not shown are the physical line interfaces between the input link and the TSPP 14. The FSPP receives cells from the switch fabric and organizes those cells onto output links. Not shown are the physical line interfaces between the output link and the FSPP 16. The switch allocation table controls crossbar input to output mapping, connection bandwidth and the maximum delay through the switch fabric.

In order to traverse the switch, a cell 22 first enters the switch through an input port 24 and is buffered in a queue 26 of input buffers. The cell is then transmitted from the input buffers to a queue 28 of output buffers in an output port. From the output port 30, the cell is transmitted outside of the switch, for example, to another switch. To facilitate traversal of the switch, each input port 24 includes a TSPP 14, and each output port 30 includes an FSPP 16. The TSPPs and FSPPs each include cell buffer RAM 32 which is organized into queues 26, 28. All cells in a connection pass through a single queue at each port, one at the TSPP and one at the FSPP, for the life of the connection. The queues thus preserve cell ordering. This strategy also allows quality of service ("QoS") guarantees on a per connection basis.

Request and feedback messages are transmitted between the TSPP and FSPP to implement flow control. Flow control prevents cell loss within the switch, and is performed after arbitration, but before transmission of the data cell. Flow control is implemented on a per connection basis.

Figure 2:
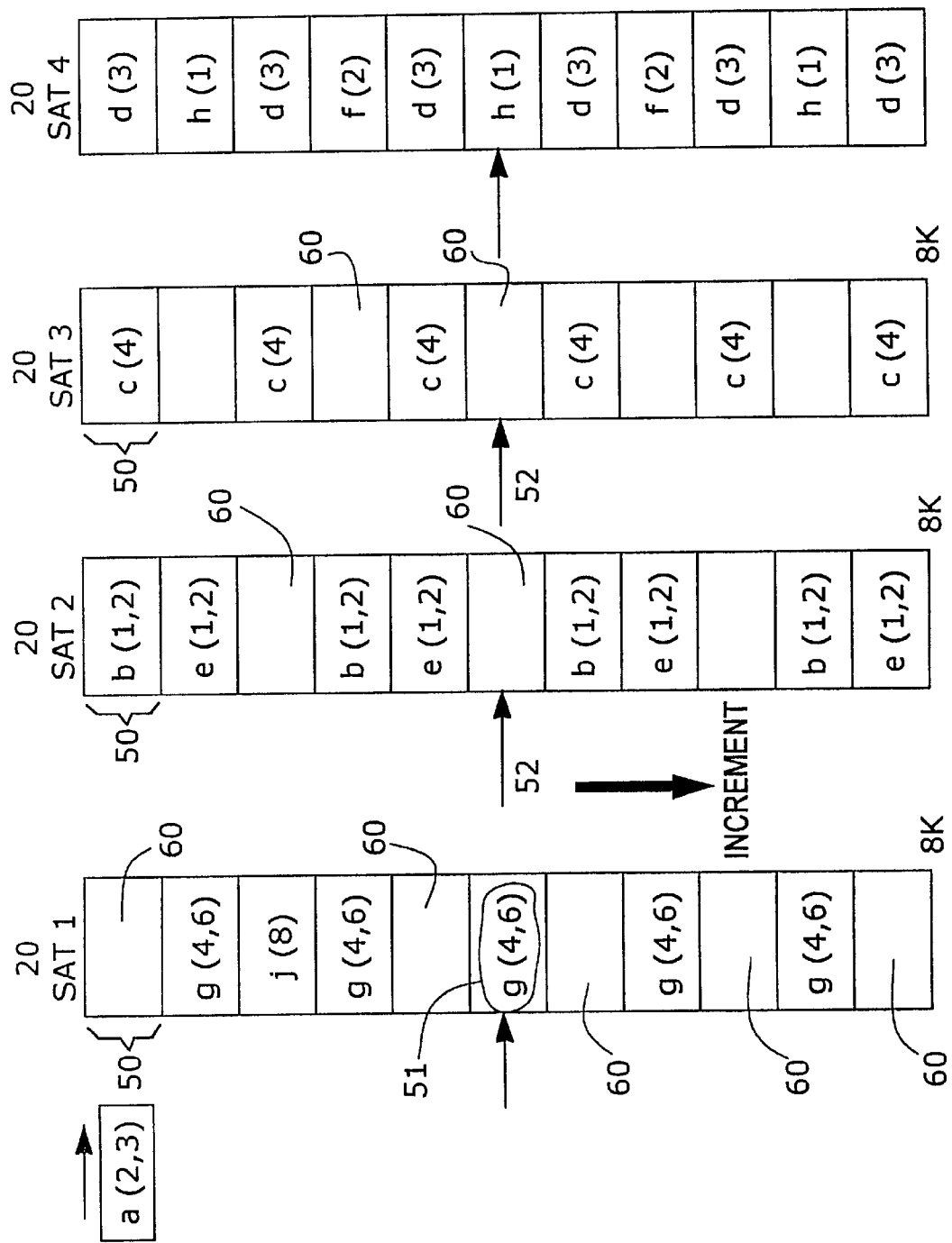
FIG. 2 is a block diagram which illustrates operation of the switch allocation tables of FIG. 1.

Referring now to FIGS. 1 & 2, each TSPP within the switch includes an SAT 20 which manages bandwidth allocation. The SAT is the basic mechanism behind cell scheduling. Each SAT 20 includes a plurality of sequentially ordered cell time slots 50 and a pointer 52 which is directed to one of the slots. All of the pointers in the switch are synchronized such that at any given point in time each of the SAT pointers at each input port is directed to the same slot location in the respective SAT with which the pointer is associated, e.g., the first slot. In operation, the pointers are advanced in lock-step, each slot being active for 32 clock cycles at 50 MHz. When the pointer is directed toward a slot, the TSPP uses the corresponding entry 51 in the SAT to obtain a cell for launching into the switch fabric 10 and to begin flow control.

Each of the counters is incremented once for each cell time, and the pointer returns to the first slot after reaching the last slot. Hence, given an SAT depth of 8 k, which defines a frame, the pointers scan the SATs approximately every 6 msec, thereby providing a maximum delay for transmission opportunity of approximately 6 msec. The delay can be decreased by duplicating a given entry at a plurality of slots within the SAT. The maximum delay that an incoming cell will experience corresponds to the number of slots between the pointer and the slot containing the entry which specifies the destination of the cell. When multiple entries are made in order to decrease the maximum possible number of separating slots, the duplicate entries are therefore preferably spaced equidistantly within the SAT. Maximum delay for transmission opportunity therefore corresponds to the frequency and spacing of duplicate entries within the SAT.

The amount of bandwidth granted to a particular connection corresponds to the frequency at which a given entry appears in the SAT. Each slot 50 provides 64 Kbps of bandwidth. Since the pointers cycle through the SATs at a constant rate, the total bandwidth granted to a particular connection is equal to the product of 64 Kbps and the number of occurrences of that entry. For example, connection identifier "g (4,6)," which occurs in five slots, is granted 320 Kbps of bandwidth.

Significantly, instantaneously unused bandwidth 60 will become available in the switch during operation. Such instantaneously unused bandwidth may occur because that bandwidth, i.e., that entry in the SAT, has not been allocated to any connection. Such bandwidth is referred to as "unallocated bandwidth." Instantaneously unused bandwidth may also occur when the SAT entry is allocated to a connection, but the connection does not have a cell enqueued for transmission across the switch. Such bandwidth is referred to as "unused-allocated" bandwidth. Both types of bandwidth are collectively referred to as "dynamic" bandwidth, and some connections, such as connections assigned an Available Bit Rate ("ABR") QoS level utilize such dynamic bandwidth. The bandwidth arbiter operates to increase efficiency within the switch by granting dynamic bandwidth to such connections.

Figures 3, 4:
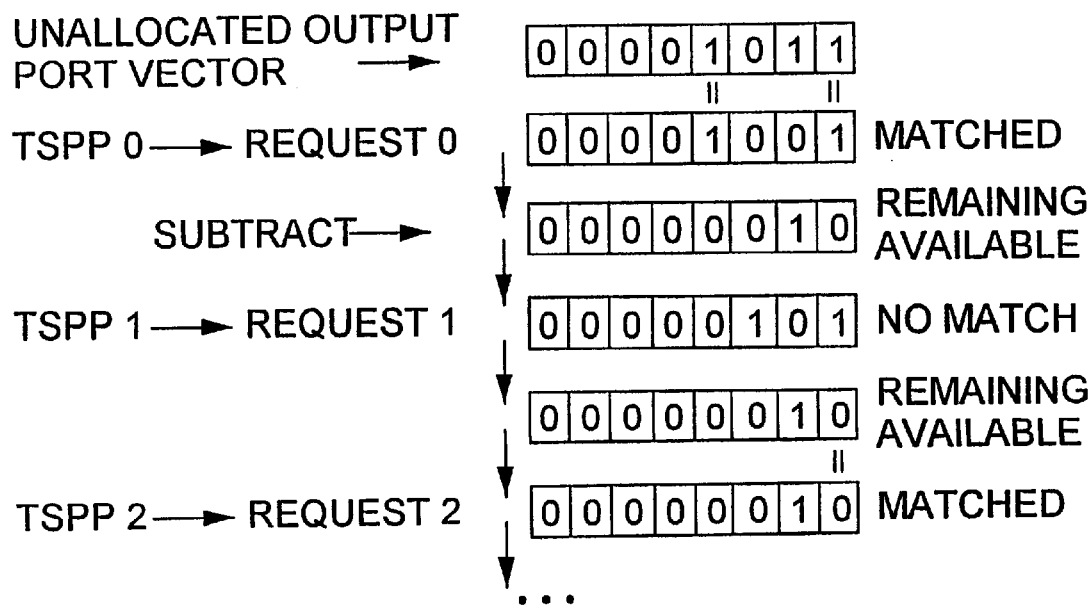
FIG. 3 is a block diagram which illustrates operation of the bandwidth arbiter list.
FIG. 4 is a flow diagram which illustrates matching between the request bit vectors and the unassigned output port bit vector.

Referring now to FIGS. 1–3, if a connection has no allocated bandwidth, or if the arriving cell rate is greater than the allocated rate as indicated by an input queue threshold, dynamic bandwidth may be employed. In either situation the point-to-multipoint transmission described in the SAT entry 51 is entered into a list 53 maintained by the bandwidth arbiter as a "request" in order that the point-to-multipoint transmission can be made at the next available opportunity.

The list 53 maintained by the bandwidth arbiter includes two fields for storing point-to-multipoint transmissions which utilize dynamic bandwidth. A connection identifier field 56 is employed to store the connection identifier, e.g., "a," and hence also indicates the port of origin. A bit vector field 58 is employed to indicate the designated output ports for transmission. The bit vector field is a bit mask which, in the case of an 8×8 switch, includes eight bits, each bit corresponding to a specific output port. Thus, for the exemplary SAT entry "a (2,3)" the list 53 contains "00000110" in the bit vector field (where the port numbers start from "1" rather than "0"). The logic "1" values in the bit vector field indicate destination output ports "2" and "3," and the logic "0" values indicate non-destination output ports. The connections and bit vectors in the list 53 are entered sequentially in the order in which they are received.

In an alternate implementation, point-to-multipoint connections can be divided into subsets. A cell is transferred to each one of these subsets. The point-to-multipoint bit vector lookup would have an additional identifier indicating which subset to transfer the cell to. The lists maintained at the bandwidth arbiter and TSPP would then contain both the connection identifier and the subset identifier. In the current embodiment the subset identifier is called a subqueue.

To execute point-to-multipoint transmission of cells described in the list maintained by the bandwidth arbiter, the bandwidth arbiter tests for matches between the list and dynamic bandwidth. More particularly, the connection identifier 56 and bit vector 58 corresponding to "a (2,3)" is entered into the list 53 so that the cell will be transmitted when a dynamic bandwidth opportunity becomes available for simultaneous transmission to each output port designated by the request.

Referring now to FIGS. 1–4, to determine matches between the requests in the list maintained by the bandwidth arbiter and available bandwidth, the bandwidth arbiter first calculates an unassigned output port bit vector by ORing all allocated bit vectors from the SAT and toggling each resultant bit to provide a single unassigned output port bit vector. The unassigned output port bit vector is then matched against each request. For a particular input port the entered requests are tested in parallel for a match, and for simplification matching may be made against only the first four requests in the list. If all of the bits in a request match the unassigned bit vector, a match is made. When a match is made, the request is subtracted from the unassigned bit vector, and the result serves as the new unassigned bit vector which indicates remaining available output ports for matching against other input port request bit vectors in the list. After matching against each of the requests, the matched requests are transmitted and the transmitted requests are dequeued from the list.

A prioritization technique may be used in conjunction with the matching operation in the bandwidth arbiter in order to support switch traffic having different priority levels, such as QoS levels. To implement such prioritization each TSPP defines a priority level for each submitted request. Such priority levels could be HI and LO levels, or include greater than two levels. When prioritization is implemented the bandwidth arbiter attempts to match higher priority requests before attempting to match lower priority requests. Since the unassigned bit vector contains less unassigned bits as each subsequent match is made, the higher priority requests are then more likely to obtain a match and be transmitted than the lower priority requests. This higher likelihood for a match translates into a quicker response and greater bandwidth for such higher priority connections.

Figure 5:
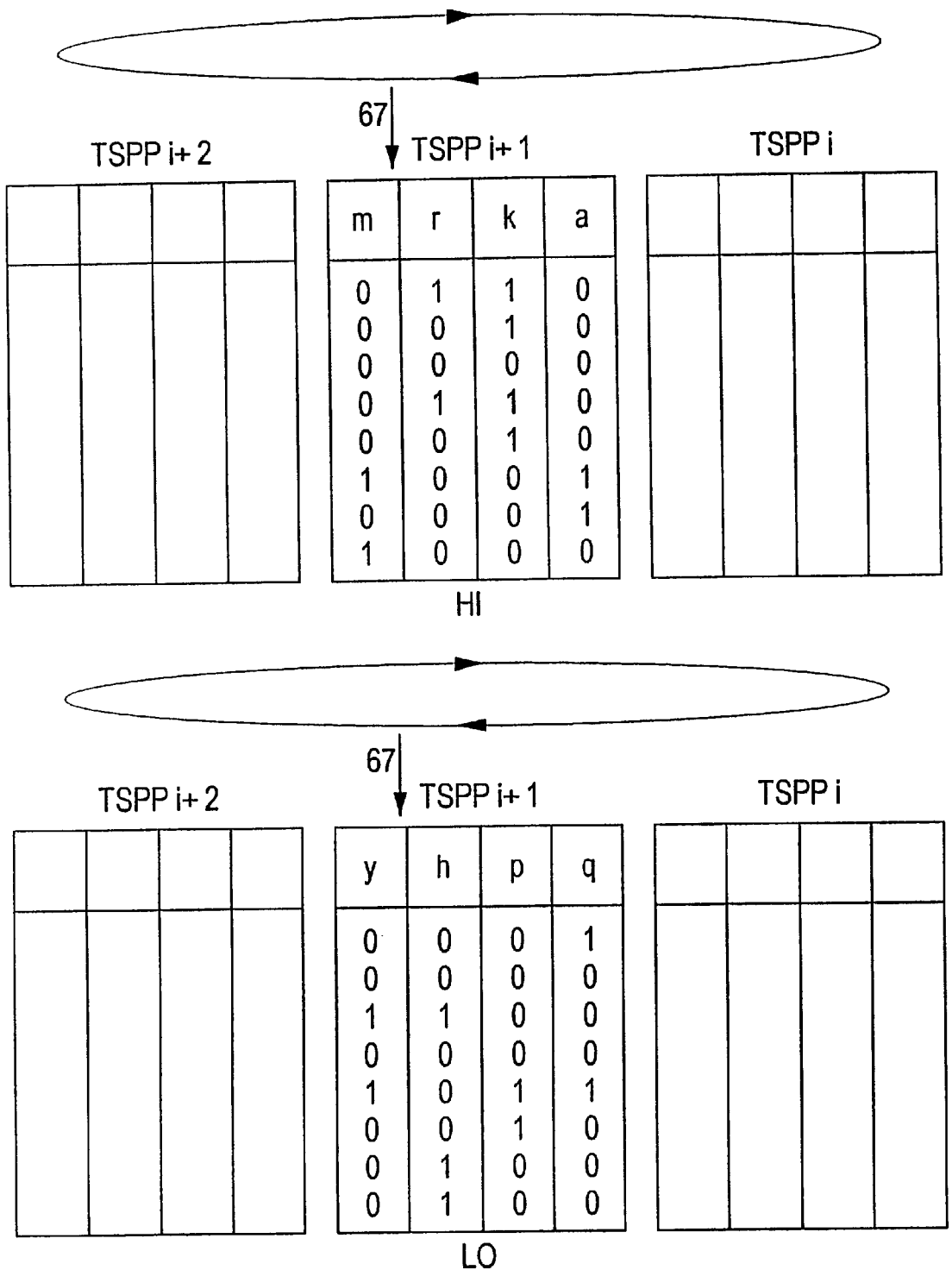
FIG. 5 is a block diagram which illustrates round-robin allocation of bandwidth to TSPP requests.

Referring now to FIG. 5, the bandwidth arbiter may grant bandwidth to requesting TSPPs by attempting to match available bandwidth on a round-robin basis. A pointer 67 is employed to select a TSPP with which matches are first attempted, e.g., TSPP i+1. After attempting matches with TSPP i+1 matches are next attempted with TSPP i+2, and so on ending with TSPP i such that matches are attempted with each TSPP. If the first TSPP (here TSPP i+1) is able to transmit the cell in the oldest entry (here described by connection "a") then the pointer 67 begins with the next TSPP (here TSPP i+2) at the next cell time. However, if the first TSPP is not able to transmit the cell in the oldest entry then the pointer 67 begins with the same TSPP (here TSPP i+1) at the next cell time. When multiple matches are determined for a single TSPP the oldest match is selected for transmission. Thus, every point-to-multipoint connection is guaranteed to receive bandwidth.

When HI and LO prioritization is employed, separate HI and LO round-robin operations are executed to grant bandwidth. Each of the round-robin operations operates in the same fashion, but matching is not attempted on the LO priority requests until a match has been attempted with each of the HI priority requests. Hence, a separate round robin operation is executed for each priority level.

To further insure that there will be opportunities for point-to-multipoint connections to transmit, a portion of unassigned bandwidth, i.e., unassigned SAT entries, may be put aside for dedication to point-to-multipoint transmissions. This technique provides increased opportunity for point-to-multipoint connections which specify a greater number of output ports to be matched and transmitted, and hence no connection will be stuck by being starved for bandwidth.

Figure 6:
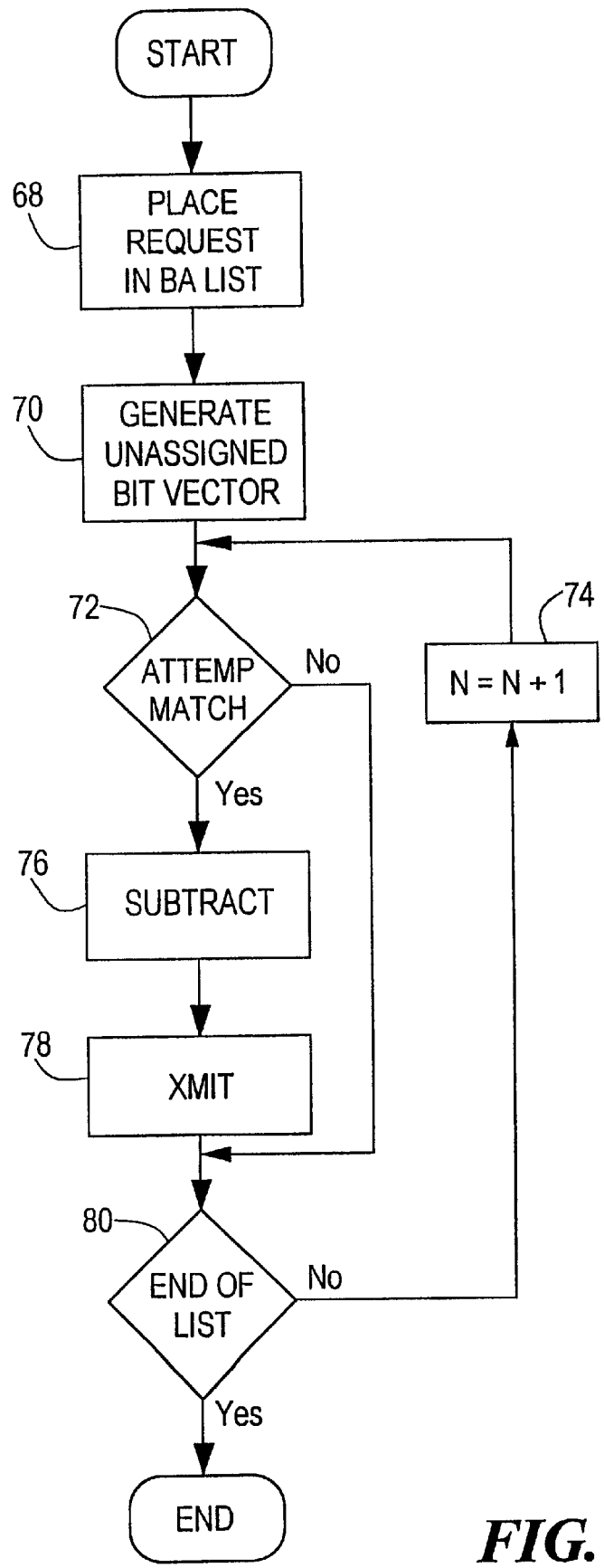
FIG. 6 is a flow diagram which illustrates a method of point-to-multipoint bandwidth arbitration.

FIG. 6 illustrates a method of point-to-multipoint arbitration. In a first step a bit vector representation of the SAT entry is entered 68 into the list as a connection identifier and output bit vector. In the next cell time, the allocated bit vectors are ORed and used to generate 70 the unassigned bit vector. An attempt is then made to match 72 the unassigned bit vector with request N in the list, where N is the oldest request in the list. If no match is made, N is incremented 74 and an attempt is made to match the unassigned bit vector with request N+1, i.e., the next oldest request in the list. If a match is made, the bit vector of the matched request is subtracted 76 from the unassigned bit vector to provide an updated unassigned bit vector. The cell corresponding to the matched request is then transmitted 78, and a determination 80 is made as to whether the end of the list maintained by the bandwidth arbiter has been reached. Flow ends if the end of the list has been reached, i.e., an attempt has been made to match the unassigned bit vector with each request in the list. If the end of the list has not been reached, N is incremented, and an attempt is made to match the next oldest request in the list with the unassigned bit vector.

Figure 7:
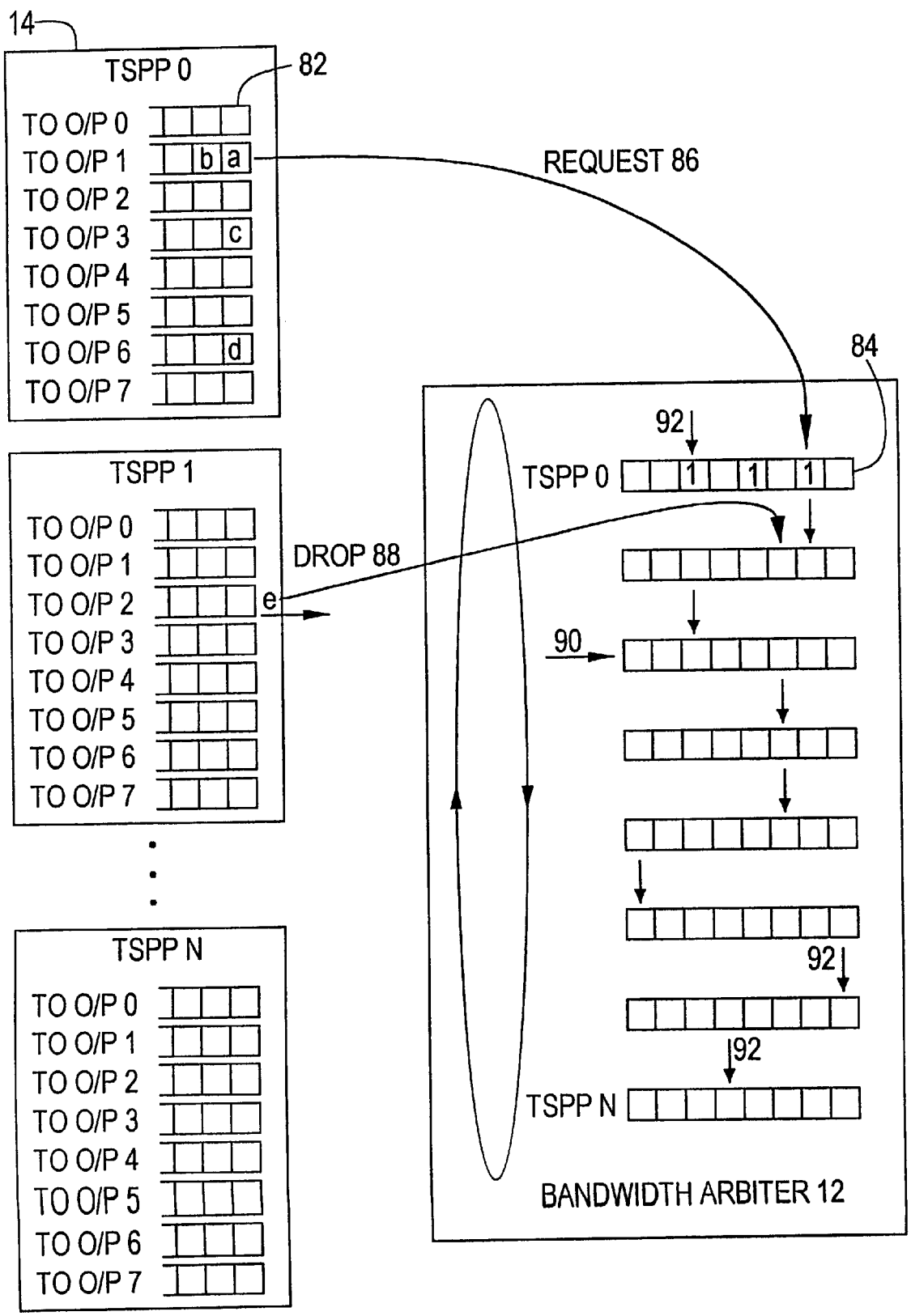
FIGS. 7 & 8 are block diagrams which illustrates point-to-point bandwidth arbitration.

Referring now to FIG. 7, the bandwidth arbiter 12 may also be employed to grant dynamic bandwidth for point-to-point transmission. Each point-to-point transmission is made from a single input port to a single output port. In order to execute point-to-point transmission each TSPP 14 includes a connection list 82 corresponding to each output port in the switch, i.e., one connection list per output port, and the bandwidth arbiter includes a point-to-point request bit vector 84 corresponding to each TSPP in the switch, i.e., one request bit vector per TSPP. The connection lists, which may be 16,384 deep, include a list of connections having cells enqueued for point-to-point transmission to the output port with which the connection list is associated. Each request bit vector is a per-TSPP bitmask which indicates with a logic "1" to which output port each individual TSPP is requesting to transmit. Together the connection lists and request bit vectors are employed to track the output ports for which cells are enqueued in each TSPP, and grant bandwidth based upon that information.

The point-to-point request bit vectors are set in response to signals from the TSPPs. More particularly, when a cell is enqueued for point-to-point transmission the connection associated with that cell is loaded into the TSPP connection list and the TSPP sends a request message 86 to the bandwidth arbiter containing a request to transmit to the output port specified by the connection. For example, when connection "a" is enqueued in connection list 1, TSPP 0 transmits a request message to the bandwidth arbiter, and in response to the request message the bandwidth arbiter sets bit 1 of request bit vector 0 to a logic "1." When the cell is transmitted to the output port, the connection is dequeued from the connection list and, if the connection list thereby empties, a Drop Request 88 message is sent to the bandwidth arbiter. In response, the bandwidth arbiter sets the bit associated with the request to a logic "0." However, if the connection list is not emptied as a result of dequeueing the connection, then the Drop Request message is not sent to the bandwidth arbiter, and the request remains in effect for the next enqueued connection.

Figure 8:
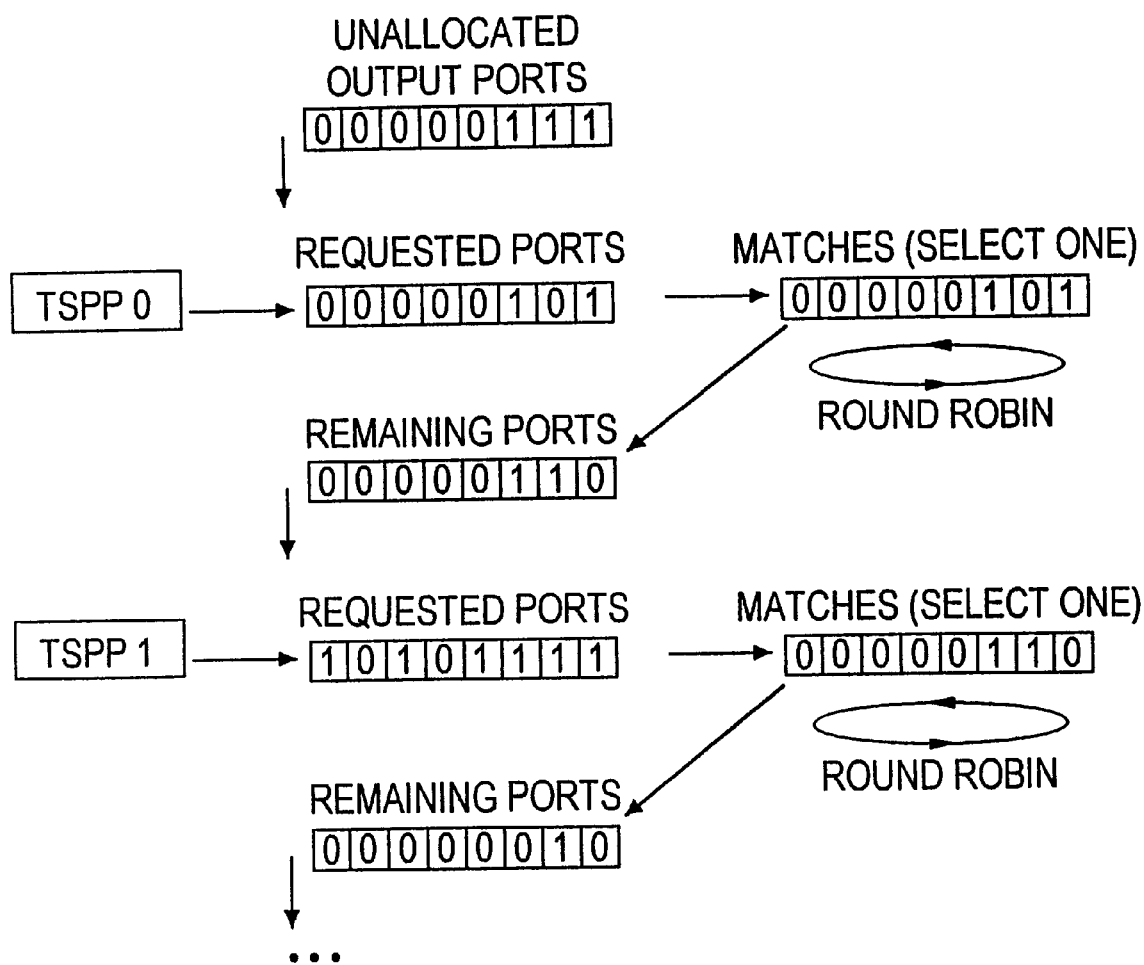

Referring now to both FIG. 7 and FIG. 8, the bandwidth arbiter employs the point-to-point request bit vectors and nested round robin operations to grant dynamic bandwidth to point-to-point connections. At the start of the cell time, matches are determined in parallel for each bit in each selected request bit vector and granting is then executed according to a prioritization scheme beginning at a first position such as position 90. Granting opportunities are then provided to the other request bit vectors until granting opportunities have been provided for each request bit vector. A second position 92 indicates an individual bit within the selected request bit vector which receives priority for the granting opportunity. If bandwidth is not granted, granting opportunities are then provided to the other bits in the request bit vector. In the next cell time the first position is then at the next sequential request bit vector relative to the previous cell time if the output port designated by the second position 92 was granted. Otherwise the first position is unchanged. The second position starting point is determined similarly. In this manner each TSPP receives equal treatment over time.

Figure 9:
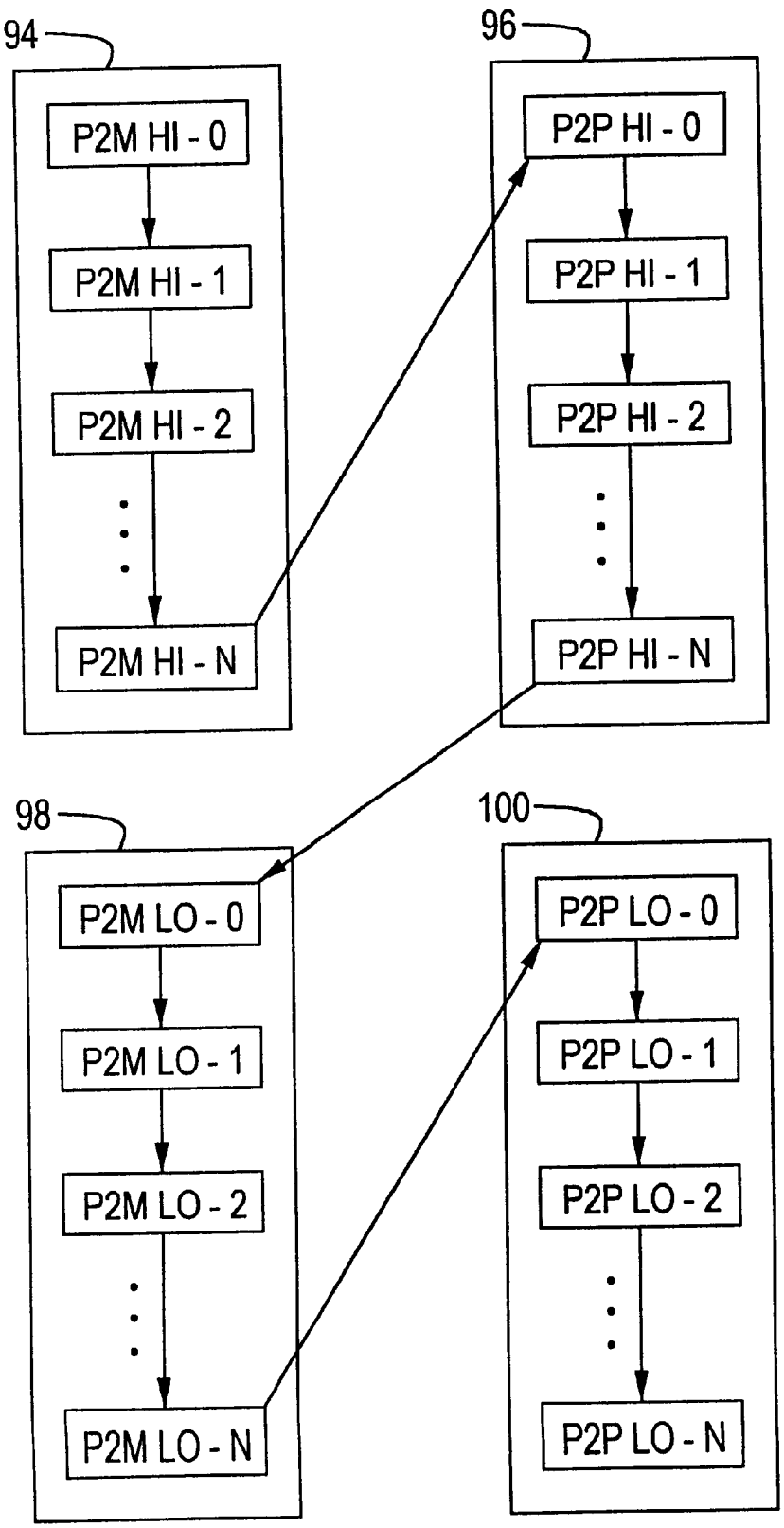
FIG. 9 is block diagram which illustrates combined point-to-point and point-to-multipoint bandwidth arbitration.

Referring now to FIG. 9, the bandwidth arbiter may include a combined arbiter mechanism for granting dynamic bandwidth for both point-to-multipoint and point-to-point connections. In the preferred embodiment both point-to-multipoint and point-to-point are prioritized into at least two levels of priority such as HI and LO. Dynamic bandwidth is then granted in four main steps. In a first step 94 dynamic bandwidth is granted to HI priority point-to-multipoint connections in the manner described with respect to FIGS. 1–6 above. In a second step 96 the dynamic bandwidth remaining from the first step is granted to the HI priority point-to-point connections in the manner described with respect to FIGS. 7–8 above. In a third step 98 the bandwidth remaining from the second step is granted to the LO priority point-to-multipoint connections. In a fourth step 100 the bandwidth remaining from the third step is granted to the LO priority point-to-point connections.

Figure 10A:
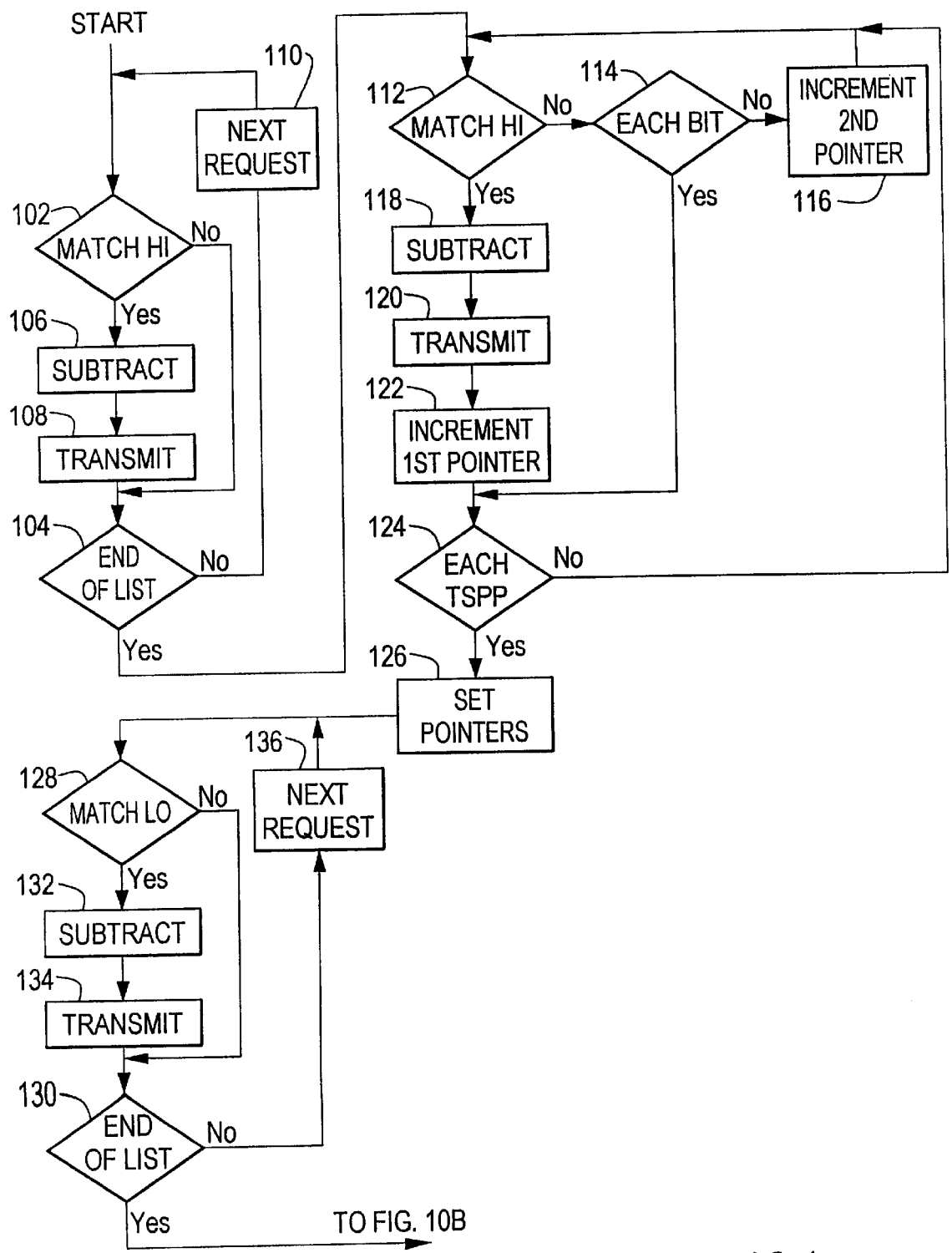
FIGS. 10A and 10B are flow diagrams which illustrate a method for combined point-to-point and point-to-multipoint bandwidth arbitration.
Figure 10B:
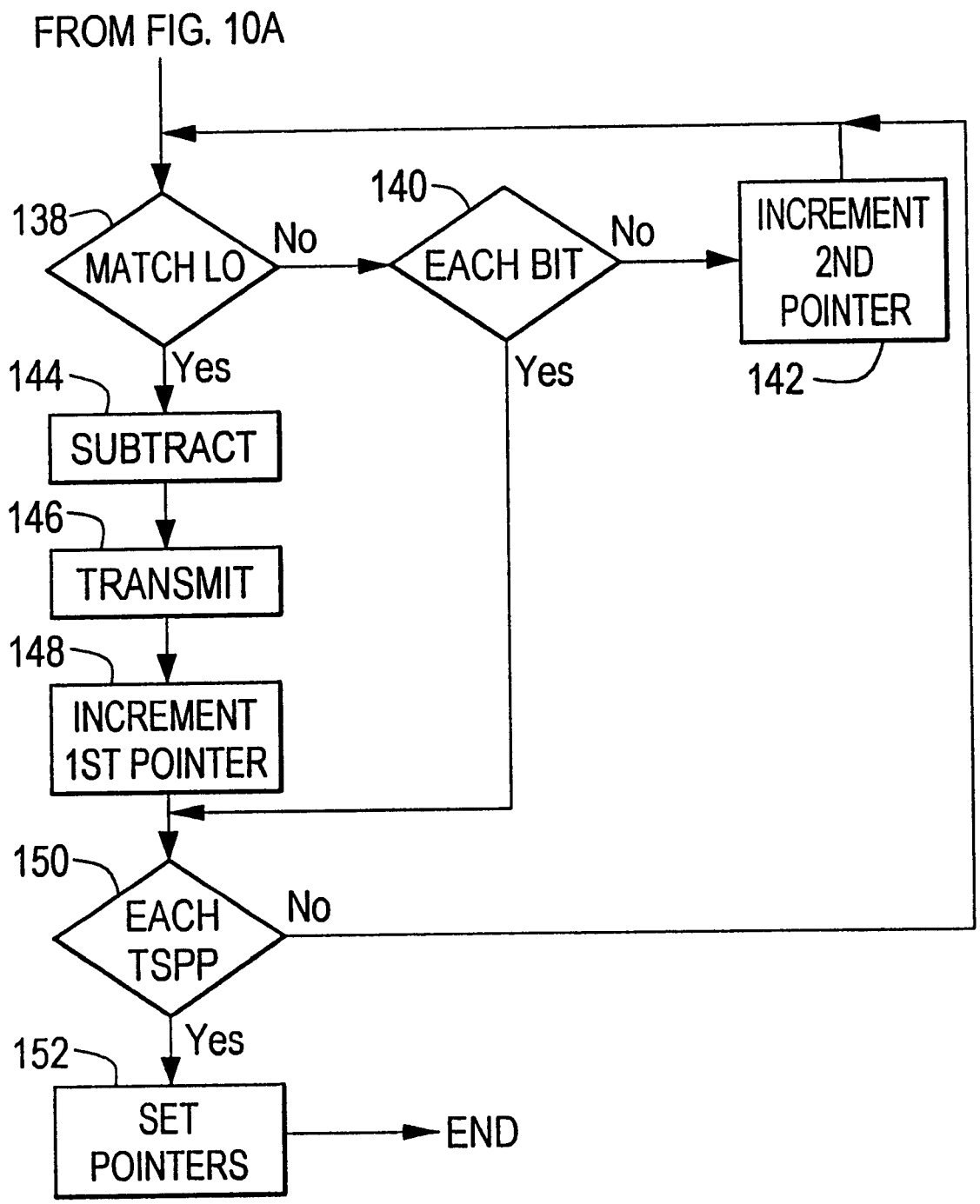

FIGS. 10A and 10B illustrate a method for allocating dynamic bandwidth to both point-to-multipoint and point-to-point connections. In a first matching step 102 an attempt is made to match the first HI priority point-to-multipoint request with the unassigned output port bit vector representing unassigned output ports, i.e., dynamic bandwidth. If no match is made, flow continues to step 104 to determine if the end of the point-to-multipoint HI priority list has been reached. If a match is found in step 102, the HI priority point-to-multipoint cell bit vector is subtracted 106 from the unassigned output port bit vector and the cell is transmitted 108. Flow then continues to step 104. If the end of the list has not been reached, then flow continues to step 110 where the next request is loaded, and flow continues at step 102. If the end of the list has been reached, flow continues to a second matching step 112.

In the second matching step 112 an attempt is made to match the first HI priority point-to-point cell indicated by the first and second pointers. If no match is made, flow continues to step 114 where a determination is made whether an attempt has been made with each bit in the point-to-point request bit vector for the TSPP indicated by the first pointer. If each bit has not been tested, the second pointer is incremented 116 and flow continues to step 112. If a match is made in step 112, the selected bit is subtracted 118 from the unassigned output port bit vector and the cell is transmitted 120. The first pointer is then incremented 122. A determination is then made in step 124 whether each TSPP has been tested for matches. If not, flow returns to step 112. If each TSPP has been tested, flow continues to step 126 where the first and second pointers are reset in accordance with the no starvation policy above.

Following step 126 the LO priority point-to-multipoint requests are tested for matches. In a third matching step 128 an attempt is made to match the first LO priority point-to-multipoint request with the unassigned output port bit vector representing unassigned output ports, i.e., dynamic bandwidth. If no match is made, flow continues to step 130 to determine if the end of the point-to-multipoint LO priority list has been reached. If a match is found in step 128, the HI priority point-to-multipoint cell bit vector is subtracted 132 from the unassigned output port bit vector and the cell is transmitted 134. Flow then continues to step 130. If the end of the list has not been reached, then flow continues to step 136 where the next request is loaded, and flow continues at step 128. If the end of the list has been reached, flow continues to a fourth matching step 138.

In the fourth matching step 138 an attempt is made to match the first LO priority point-to-point cell indicated by the first and second pointers. If no match is made, flow continues to step 140 where a determination is made whether an attempt has been made with each bit in the point-to-point request bit vector for the TSPP indicated by the first pointer. If each bit has not been tested, the second pointer is incremented 142 and flow continues to step 138. If a match is made in step 138, the selected bit is subtracted 144 from the unassigned output port bit vector and the cell is transmitted 146. The first pointer is then incremented 148. A determination is then made in step 150 whether each TSPP has been tested for matches. If not, flow returns to step 138. If each TSPP has been tested, flow continues to step 152 where the first and second pointers are reset in accordance with the no starvation policy above. Flow then ends for the cell time.

Having described the preferred embodiments of the invention, it will now become apparent to one of skill in the art that other embodiments incorporating their concepts may be used. It is felt therefore that the invention should not be limited to disclosed embodiments, but rather should be limited only by the spirit and scope of the appended claims.

What is claimed is:

1. A network switch for facilitating point-to-point and point-to-multipoint transmission of units of data associated with connections, comprising:

a plurality of output ports;

a plurality of input ports each operative to receive units of data from outside said switch and transmit the received units of data to at least one of the output ports;

an allocation map operative to store a representation of bandwidth that is allocated within the switch in a plurality of future data unit time intervals;

a point-to-multipoint request map operative to store a representation of units of data enqueued for point-to-multipoint transmission in a present data unit time interval;

a point-to-point request map operative to store a representation of units of data enqueued for point-to-point transmission in a present data unit time interval; and a matching operator which functions to identify unallocated bandwidth and allocated-unused bandwidth that may be employed to transmit ones of the units of data represented in said point-to-multipoint request map and said point-to-point request map during a data unit time interval immediately following the present data unit time interval, and selects ones of the units of data represented in said point-to-multipoint request map and said point-to-point request map for transmission in the data unit time interval immediately following the present data unit time interval so that collisions are avoided, whereby unallocated bandwidth and allocated-unused bandwidth are utilized for transmission of units of data enqueued for point-to-point and point-to-multipoint transmission when matching unallocated bandwidth and allocated-unused bandwidth becomes available in the data unit time interval immediately following the present data unit time interval.

2. The network switch of claim 1 wherein said point-to-multipoint request map includes a connection field operative to store a representation of the connection associated with each of the units of data enqueued for point-to-multipoint transmission.

3. The network switch of claim 2 wherein said point-to-multipoint request map further includes a bit vector field operative to store a representation of the output ports to which each point-to-multipoint unit of data is to be transmitted.

4. The network switch of claim 3 wherein said allocation map includes a switch allocation table operative to store an index identifier and an allocation table operative to store a bitmask which represents unallocated bandwidth and allocated-unused bandwidth within the switch, said allocation table indexed by said index identifier.

5. The network switch of claim 1 wherein said matching operator functions to match at least one of unallocated bandwidth and allocated-unused bandwidth to each unit of data enqueued for point-to-multipoint transmission via unallocated bandwidth and allocated-unused bandwidth sequentially starting from the first enqueued point-to-multipoint unit of data.

6. The network switch of claim 5 wherein the enqueued point-to-multipoint units of data are prioritized into at least two separate groups and said matching operator functions to provide opportunity for selection to higher priority groups prior to providing opportunity for selection to lower priority groups.

7. The network switch of claim 3 wherein said matching operator generates an unassigned output port bit vector which is compared with said bit vector field to provide opportunities to select the enqueued point-to-multipoint units of data for transmission via unallocated bandwidth and allocated-unused bandwidth.

8. The network switch of claim 7 wherein said request map includes a first pointer for indicating the order in which enqueued point-to-multipoint units of data are provided with opportunities for selection by said matching operator, said pointer being incremented to provide a round-robin type ordering of [unit of data matching] selection opportunities.

9. The network switch of claim 1 wherein each input port includes a To Switch Port Processor ("TSPP") having a connection list of point-to-point connections associated with each output port, said lists of point-to-point connections storing representations of connections having a unit of data enqueued for the respective output port with which the respective list is associated.

10. The network switch of claim 9 wherein said point-to-point request map includes a point-to-point request bit vector for each said TSPP, said point-to-point request bit vector indicating each output port to which a point-to-point unit of data is to be transmitted from the respective TSPP with which the point-to-point request bit vector is associated.

11. The network switch of claim 10 including a first pointer operative to select a point-to-point request bit vector for being provided with opportunities for selection by said matching operator in a round robin manner of selection.

12. The network switch of claim 11 including a second pointer operative to select an output port bit within said point-to-point request bit vector for being provided with the opportunity for selection by said matching operator in a round robin manner of selection.

13. A method for point-to-point and point-to-multipoint transmission of units of data in a network switch comprising the steps of:

in a first storing step, storing a representation of the unit of data in a first list;

in a second storing step, storing a representation of dynamic bandwidth that includes both unallocated bandwidth and allocated-unused bandwidth in a second list;

comparing the first list with the second list to determine if at least one representation in said first list matches at least one representation in said second list; and if a match is determined to exist in said comparing step, transmitting at least one unit of data for which the match is determined to exist via the dynamic bandwidth.

14. The method of claim 13 wherein said first storing step includes the further step of storing a request map including a connection field operative to store a representation of the connection associated with each unit of data enqueued for point-to-multipoint transmission.

15. The method of claim 14 wherein said first storing step includes the further step of storing a request bit vector representation of each output port to which the unit of data is to be transmitted.

16. The method of claim 15 wherein said second storing step includes the further step of storing a bitmask which represents dynamic bandwidth within the switch.

17. The method of claim 16 wherein said comparing step includes the further step of comparing the dynamic bandwidth bitmask with the request bit vector.

18. The method of claim 17 wherein a plurality of request bit vectors are stored and said comparing step includes the further step of prioritizing the request bit vectors into at least two separate groups arranged from high priority to low priority, said comparing step being performed upon higher priority request bit vectors prior to said lower priority request bit vectors.

19. The method of claim 17 wherein the request bitmask field includes a pointer for indicating which the order in which enqueued units of data are first matched to dynamic bandwidth, said comparing step including the further step of incrementing the pointer to provide a round-robin type ordering of unit of data matching.

20. The method of claim 13 wherein said first storing step includes storing a point-to-point request bit vector for each input port in the switch, the request bit vectors containing a indicator of each output port requested by each input port in the switch.

21. The method of claim 20 wherein said first storing step includes the further step of storing a plurality of lists of point-to-point connections having a unit of data enqueued for respective output ports with which the respective list is associated.

22. An asynchronous transfer mode ("ATM") switch for arbitrating transmission of point-to-point cells and point-to-multipoint cells in a present data unit time interval, comprising:
   a plurality of input ports operative to receive cells comprising point-to-point cells and point-to-multipoint cells;
   a plurality of output ports operative to transmit said received cells from said switch;
   a switch fabric operative to selectively forward said cells from said plurality of input ports to selected ones of said plurality of output ports; and
   an arbitration operator operative to match ones of the point-to-point cells and ones of the point-to-multipoint cells to dynamic bandwidth that comprises unallocated bandwidth and allocated-unused bandwidth in a data unit time interval immediately following the present data unit time interval, said arbitration operator also operative to determine which cells received in said plurality of input ports are forwarded to said plurality of output ports through said switch fabric such that point-to-point and point-to-multipoint cells which are matched to dynamic bandwidth by said arbitration operator are forwarded to specified ones of said plurality of output ports so as to avoid collisions.

23. The ATM switch of claim 22 wherein point-to-multipoint cells matched to the dynamic bandwidth are directed to specified ones of said plurality of output ports by said arbitration operator before point-to-point cells which match dynamic bandwidth are directed to specified ones of said plurality of output ports by said arbitration operator.

24. The ATM switch of claim 22 wherein said arbitration operator prioritizes the point-to-point cells into at least first and second groups of higher and lower priority, respectively.

25. The ATM switch of claim 24 wherein said arbitration operator prioritizes the point-to-multipoint cells into at least first and second groups of higher and lower priority, respectively.

26. The ATM switch of claim 25 wherein said high priority groups are matched to dynamic bandwidth prior to said low priority groups.

27. The ATM switch of claim 26 wherein said high priority point-to-multipoint cells are matched to dynamic bandwidth prior to said high priority point-to-point cells.

28. The ATM switch of claim 27 wherein said low priority point-to-multipoint cells are matched to dynamic bandwidth prior to said low priority point-to-point cells.

29. The ATM switch of claim 22 wherein said arbitration operator maintains a record of each point-to-point cells at least until such cell enters said switch fabric, said record including an indication of the output port to which the cell is to be transmitted.

30. The ATM switch of claim 29 wherein said arbitration operator maintains a record of each point-to-multipoint cell at least until such cell enters said switch fabric, said record including an indication of the output ports to which the cell is to be transmitted.

31. The ATM switch of claim 30 wherein when a point-to-point cell is received in an input port, a corresponding request message is sent to said arbitration operator indicating that the cell is enqueued and identifying the output port to which the point-to-point cell is to be transmitted.

32. The ATM switch of claim 31 wherein, when the point-to-point cell is dequeued, a drop request message is sent to said arbitration operator from said input port.

33. A network switch having a plurality of input ports for receiving data units associated with connections at the respective input ports, a plurality of output ports for transmitting data units associated with said connections to communication links coupled to the respective output ports, said network switch comprising:
   bandwidth allocation data structures operative to store a representation of output ports which are available for receipt of data units from input ports competing for such output ports during an imminent data unit time interval;
   a first set of request data structures operative to store an indication of data units enqueued for transmission from one of said plurality of input ports to at least two of said plurality of output ports;
   a second set of request data structures operative to store an indication of data units enqueued for transmission from at least one of said plurality of input ports to a respective selected one of said plurality of output ports for each of said input ports having a data unit enqueued for transmission;
   matching control logic operative to match indications of data units enqueued for transmission in said first and second request sets of data structures with available output ports available for receipt of said data units competing for such output ports during said imminent data unit time interval; and
   arbitration logic operative to forward selected ones of said data units from selected ones of said input ports to selected ones of said output ports upon matching of said indications of selected ones of said data units enqueued for transmission in said first and second request sets of data structures with said output ports available for receipt of data units as reflected in said bandwidth allocation data structures.

34. The network switch of claim 33 wherein the matching control logic is operative to match indications of data units enqueued for transmission in said first set of data structures with available output ports available for receipt of said data units competing for such output ports during said specified time intervals prior to matching indications of data units enqueued for transmission in said second set of data structures with available output ports available for receipt of said data units.

35. The network switch of claim 33 wherein said arbitration logic is operative to prioritize data units represented in the second set of request data structures into at least first and second groups of higher and lower priority, respectively.

36. The network switch of claim 35 wherein said arbitration logic is operative to prioritize data units represented in the first set of request data structures into at least first and second groups of higher and lower priority, respectively.

37. The network switch of claim 36 wherein the matching control logic is operative to match data units represented in each of said high priority groups with available output ports prior to matching data units represented in said low priority groups with available output ports.

38. The network switch of claim 37 wherein the matching control logic is operative to match data units represented in the first group of the first set of request data structures to available output ports prior to matching data units represented in the first group of the second set of request data structures to available output ports.

39. The network switch of claim 38 wherein the matching control logic is operative to match data units represented in the second group of the first set of request data structures to available output ports prior to matching data units represented in the second group of the second set of request data structures to available output ports.

40. The network switch of claim 33 wherein said arbitration logic maintains an indication of each output port from which each data unit represented in the second set of request data structures is enqueued to be transmitted.

41. The network switch of claim 40 wherein said arbitration logic maintains an indication of each output port from which each data unit represented in the first set of request data structures is enqueued to be transmitted.

42. The network switch of claim 41 wherein a request message corresponding to each data unit represented in the second set of request data structures is communicated from the associated input port to the arbitration logic, the request message indicating that such data unit is enqueued and indicating the output port to which such data unit is enqueued to be transmitted.

43. The network switch of claim 42 wherein, when such data unit is dequeued, a drop request message is communicated to the arbitration logic from the associated input port.

* * * * *

UNITED STATES PATENT AND TRADEMARK OFFICE
CERTIFICATE OF CORRECTION

PATENT NO : 5,956,342
DATED : September 21, 1999
INVENTOR(S) : Thomas A. Manning, et al.

It is certified that error appears in the above-identified patent and that said Letters Patent are hereby corrected as shown below:

Front Page [75], Inventors, "Thomas A. Manning, Northboro; Stephen A. Caldara, Sudbury; Stephen A. Hauser, Burlington; Matthias L. Colsman, Cologne, all of Mass." should read as follows:

--Thomas A. Manning, Northboro, Mass.; Stephen A. Caldara, Sudbury, Mass.; Stephen A. Hauser, Burlington, Mass.; Matthias L. Colsman, Cologne, Fed. Rep. Of Germany.-- and Column 10, line 25, claim 8, "[unit of data matching] selection opportunities.", should read --selection opportunities.--.

Signed and Sealed this

First Day of May, 2001

Attest:

NICHOLAS P. GODICI

Attesting Officer     *Acting Director of the United States Patent and Trademark Office*